May 10, 1960 — D. W. SOUZA — 2,935,868
RADIATOR TESTING DEVICE
Filed May 9, 1957

INVENTOR.
David W. Souza
BY *Manfred Warren*
*His* Attorney

United States Patent Office 2,935,868
Patented May 10, 1960

2,935,868

RADIATOR TESTING DEVICE

David W. Souza, Oakland, Calif.

Application May 9, 1957, Serial No. 658,063

4 Claims. (Cl. 73—45.8)

The invention relates to apparatus designed for the testing of radiator cores of the type used in automotive equipment and more especially those having spaced header plates or flanges at the opposite ends of the finned radiator tubes.

The testing of leaky radiators for automobiles, buses, trucks and the like is customarily slow and cumbersome work. The radiators are normally removed from the vehicles and dismantled by taking off the top and bottom tanks from the upper and lower ends of the radiator core. The core is cleaned, and inspected for breaks, which are soldered. In order to test the cores it is customary to replace the radiator tanks or special end caps made for testing service, the tanks or caps being soldered or bolted onto the ends of the core. Air pressure is then applied to one of the end chambers to pressurize the core, which is then submerged in water to detect additional leaks. These leaks most frequently occur at the joinder of the tubes and header plates and in order to repair these leaks it is necessary that the end tanks again be removed and the leaky core tube soldered. Thereafter the end tanks are reapplied and the process repeated until all of the leaks are found and sealed off.

An object of the present invention is to provide an apparatus which can be quickly, simply and easily applied to the header plates of the radiator core to be tested, in order to provide the necessary sealed, pressurized end chambers for testing the cores as above, the use of the present device thus obviating the slow, cumbersome work of resoldering or rebolting the radiator tanks to the core in order to test the core for leaks.

Another object of the present invention is to provide a device of the character described which may be simply and quickly and effectively adjusted to fit and to be applied to a variety of radiator sizes as required to be repaired in the radiator repair shops.

A further object of the present invention is to provide a device of the character above which is composed of a minimum number of ruggedly formed parts designed to withstand the hard use and abuse likely to be encountered in radiator repair shops so as to afford the device a long and useful life.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings (one sheet):

Figure 1:
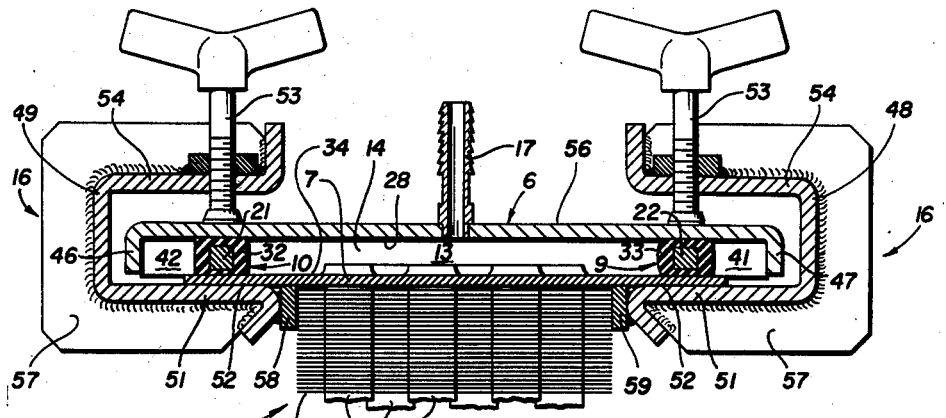
Figure 1 is a cross-sectional view of the radiator testing device constructed in accordance with the present invention and shown operatively applied to a radiator core to be tested.

The radiator testing device of the present invention consists, briefly, of an elongated plate 6 dimensioned for mounting in spaced parallel opposed relation to the header flange 7 of a radiator core 8 to be tested, a pair of elongated sealing members 9 and 10 carried by and extending longitudinally of plate 6 and mounted thereon for adjustable widthwise separation and formed of material adapted for sealed engagement with plate 6 and header flange 7, a second pair of sealing members 12 and 13 dimensioned for mounting on the plate 6 between sealing members 9-10 and in sealed engagement therewith and with the plate 6 and flange 7 to define a closed chamber 14 between the plate 6 and flange 7, and clamp means 16 for securing the plate 6 on flange 7 with the sealing members 9—10 and in sealed engagement therebetween. Plate 6 is formed with an air hose fitting 17 for convenient connection to an air hose (not shown) for charging of chamber 14 and connected core tubes 18 preparatory to submerging in water for testing. A pair of such testing devices may thus be applied to the header plates at the opposite ends of the radiator core 8.

Figure 2:
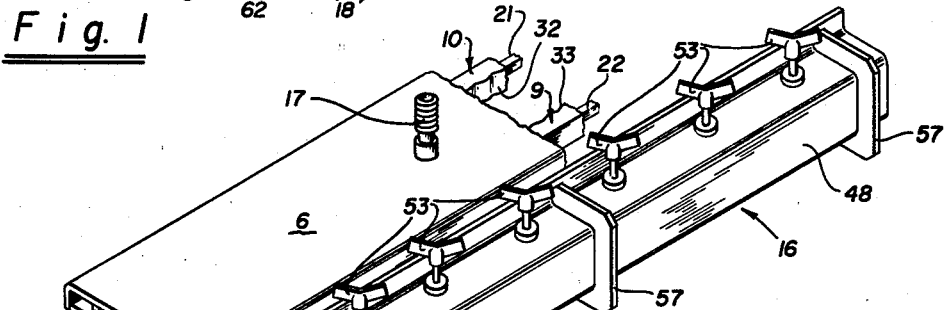
Figure 2 is a perspective view of a part of the device.
Figure 3:
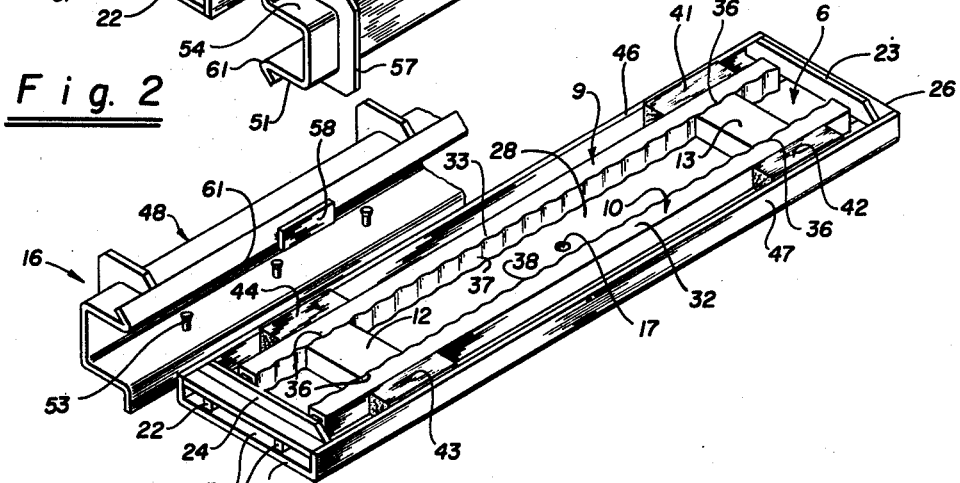
Figure 3 is a perspective view showing other portions of the device.

The members 9 and 10 are here preferably composed of a pair of elongated steel rods or bars 21 and 22 which extend for substantially the full length of plate 6, see Figure 3, and are here retained on the plates by cross-members 23 and 24 mounted at the opposite ends 26 and 27 of plate 6 in spaced relation to the under side 28 of the plate so as to define widthwise extending slots 31, see Figures 2 and 3, at each of the ends 26—27 of the plate within which the rod ends may reciprocate for adjusting the widthwise separation of the rods. For sealing purposes, the rods 21—22 are provided with jackets 32 and 33 of soft, compressible material such as rubber for effecting the sealed engagement of the members with the under side 28 of plate 6 and the outer face 34 of flange 7. Preferably the plate surface 28 is flat and smooth and the rubber jackets 32 and 33 are of flat, rectangular peripheral form so as to obtain maximum face-to-face contact sealing area between the parts. The jackets 32—33, as will be observed from Figure 3, extend for substantially the full length of the rods 21—22 between the cross-members 23—24. The term "rubber" is here used in a general sense and is intended to include natural and synthetic rubber and their mixtures and components.

The transversely extending sealing members 12 and 13 are here preferably composed of rubber blocks which are dimensioned for filling the space between the members 9—10 and for mounting therebetween at selectable lengthwise positions so as to accommodate the device to the length of the header flange 7 to which it is to be applied. The blocks 12 and 13 are accordingly preferably of generally rectangular form so as to present flat sealing surfaces to the under side 28 of plate 6 and the outer side 34 of header 7. Sealing between the blocks 12—13 and the jackets 32—33 may be assisted by fashioning the end surfaces 36 of the blocks 12—13 and the opposed longitudinal surfaces 37 and 38 of the longitudinal sealing members engaged therewith, of undulating interfitting form, as seen in Figure 3, so as to provide for the selectable lengthwise positioning of the members 12—13 along the length of members 9—10 while maintaining an interfitted sealed engagement between these members.

Sealing of members 12—13 to the longitudinal members 9—10 is also assisted by the provision of means, here in the form of a plurality of blocks 41, 42, 43 and 44, urging the rubber jackets 32—33 laterally into sealed engagement with the ends of blocks 12—13. Blocks 41—44 are here wedged into place between depending edge flanges 46 and 47 provided on plate 6, and the outer longitudinal sides of the elongated sealing members 9—10. The function of these blocks is to serve as jacks for compressively securing the transverse sealing members 12—13 between the longitudinal sealing members 9—10, and the members 41—44 may be formed of wood or other suitable material, it not being necessary that they in themselves provide any sealing surface. As will be understood, a plurality of sets of sealing members 12—13 and blocks 41—44 are used with the device for providing a full range of widthwise adjustment of the longitudinal sealing members 9—10 to fit the header plates to which they are to be applied.

The clamp means 16 is here composed of a pair of elongated channel-shaped members 48 and 49 dimensioned for surrounding the superimposed longitudinal edge portions of the plate 6 and header 7, see Figure 1, with one side 51 of each of the channel members supporting the under side 52 of the header, and a plurality of hand screws 53 carried by the opposite side 54 of each of the channel members and bearing against the outer surface 56 of the plate for compressively securing the plate and header and sealing members therebetween. Preferably the channel members 48—49 are made quite deep so as to afford a wide range of transverse adjustment accommodating the clamp means to different size headers, and in all of the recommended positions of the clamping means the hand screws 53 should be substantially aligned with the longitudinal sealing members 9—10 so as to apply a direct clamping force thereto. A series of strong back ribs 57 may be welded or otherwise secured around the outer side of the channel members 48—49 at spaced longitudinal positions to effect proper reinforcement.

Proper positioning of the clamping members 48—49 on the opposite side edges of the header flange 7 is here effected by the provision on each of the channel sides 51 of pairs of guide spacer members 58 and 59 which are arranged in longitudinally spaced relation along the length of the open edge face 61 of such sides for engagement with the core fins 62. Accordingly, to properly position the device on the header of the radiator to be tested, the operator will only need slide the channel members 48—49 into place with the guide spacer members 58 moved into engagement with the opposite ends of the horizontally extending cooling fins fixed to the radiator tubes 18. In this position the hand screws 53 will be brought into substantial alignment with the proper positioning of the longitudinal sealing members 9 and 10.

Also the members 58 act as spacers and insure space for viewing of the edge portions of the radiator core for leaks, and provide working space for soldering.

To apply the device of the present invention to the header flange 7 of a radiator core to be tested, a set of blocks 12 and 13 and 41—44 are selected to adjust the transverse spacing of the longitudinal sealing members 9—10 to the width of the header flange sealing members 12 and 13 are positioned longitudinally with respect to the sealing members 9 and 10 so as to fit the length of the header flange of the core to be tested, and blocks 41—44 are inserted into place so as to secure sealing members 12—13 in their adjusted position. Plate 6 is then mounted on the header flange, as illustrated in Figure 1, and the side clamping channel members 48—49 may be moved into place surrounding the superimposed longitudinal edge portions of the plate 6 and the header 7, and with the guide members 58 in contact with the core fins 62, following which the hand screws 53 may be tightened for compressively securing the sealing members 32, 33, 12 and 13 between the opposed parallel surfaces 28 and 34 of plate 6 and header 7 thus squeezing, compressing and spreading rubber sealing members 32, 33, 12 and 13 into tightly sealed relation between these surfaces and with each other to form the closed chamber 14.

I claim:
1. A radiator testing device comprising; an elongated plate formed with opposite edge flanges and dimensioned for mounting in spaced parallel opposed relation to the header of a radiator core to be tested with said flanges extending in the direction of said header, a pair of elongated metal rods carried by and extending longitudinally of said plate substantially parallel to said edge flanges and being mounted on said plate for adjustable widthwise separation, rubber jackets on said rods adapted for sealed engagement with said plate and header, a pair of rubber sealing members dimensioned for mounting on said plate at selectable lengthwise positions between said jackets, blocks mounted between said plate edge flanges and said jackets and urging said jackets laterally into sealed engagement with said rubber members, and clamp means for securing said plate on said header with said jackets and sealing members compressed therebetween.

2. A radiator testing device comprising; an elongated plate dimensioned for mounting in spaced parallel opposed relation to the header flange of a radiator core to be tested, a pair of elongated sealing members carried by and extending longitudinally of said plate and mounted thereon for adjustable widthwise separation and formed of material adapted for sealed engagement with said plate and header flange, a second pair of sealing members dimensioned for mounting on said plate between said first mentioned members and in sealed engagement therewith and with said plate and flange to define a closed chamber between said plate and flange, a pair of elongated channel-shaped members dimensioned for surrounding the superimposed longitudinal edge portions of said plate and header flange with one side of each of said channel members supporting said header flange, and a plurality of hand screws carried by the opposite side of each of said channel members and bearing against said plate for compressively securing said plate and header flange and sealing members.

3. A radiator testing device comprising; an elongated plate formed with opposite edge flanges and dimensioned for mounting in spaced parallel opposed relation to the header of a radiator core to be tested with said flanges extending in the direction of said header, a pair of elongated metal rods carried by and extending longitudinally of said plate substantially parallel to said edge flanges and being mounted on said plate for adjustable widthwise separation, rubber jackets on said rods adapted for sealed engagement with said plate and header, a pair of rubber sealing members dimensioned for mounting on said plate at selectable lengthwise positions between said jackets, blocks mounted between said plate edge flanges and said jackets and urging said jackets laterally into sealed engagement with said rubber members, a pair of elongated channel-shaped members dimensioned for surrounding the superimposed longitudinal edge portions of said plate and header with one side of each of said channel members supporting said header, and a plurality of hand screws carried by the opposite side of each of said channel members and bearing against said plate for compressively securing said plate and header and jackets and sealing members therebetween.

4. A radiator testing device comprising; an elongated plate dimensioned for mounting in spaced parallel opposed relation to the header flange of a radiator core to be tested, a pair of elongated sealing members carried by and extending longitudinally of said plate and mounted thereon for adjustable widthwise separation and formed of material adapted for sealed engagement with said plate and header flange, a second pair of transversely extending sealing members dimensioned for mounting on said plate between said first mentioned members and having end surfaces engageable with longitudinal surfaces of said first members to define a closed chamber between said plate and flange, said longitudinal and end surfaces being fashioned of undulating interfitting form providing selectable lengthwise positioning of said transverse members along said first members and in interfitting sealed engagement therewith, and clamp means for securing said plate on said flange with said sealing members compressed therebetween.

References Cited in the file of this patent

UNITED STATES PATENTS

| | | |
|---|---|---|
| 1,720,066 | Warburton | July 9, 1929 |
| 2,231,518 | Boerger | Feb. 11, 1941 |
| 2,565,119 | Block | Aug. 21, 1951 |
| 2,779,611 | Wernert | Jan. 29, 1957 |